(12) United States Patent
Hawley

(10) Patent No.: US 11,771,008 B1
(45) Date of Patent: Oct. 3, 2023

(54) COMBINE CROP TRASH REMOVAL SYSTEM

(71) Applicant: Aron Hawley, Brock, NE (US)

(72) Inventor: Aron Hawley, Brock, NE (US)

( * ) Notice: Subject to any disclaimer, the term of this patent is extended or adjusted under 35 U.S.C. 154(b) by 386 days.

(21) Appl. No.: 16/824,688

(22) Filed: Mar. 19, 2020

Related U.S. Application Data

(60) Provisional application No. 62/820,457, filed on Mar. 19, 2019.

(51) Int. Cl.
| | |
|---|---|
| *A01F 12/48* | (2006.01) |
| *A01F 12/46* | (2006.01) |
| *A01F 12/10* | (2006.01) |
| *A01D 41/12* | (2006.01) |
| *A01D 61/00* | (2006.01) |

(52) U.S. Cl.
CPC .......... *A01F 12/48* (2013.01); *A01D 41/1252* (2013.01); *A01F 12/10* (2013.01); *A01F 12/46* (2013.01); *A01D 61/008* (2013.01)

(58) Field of Classification Search
CPC .......... A01F 12/48; A01F 12/10; A01F 12/46; A01D 41/1252; A01D 61/008
See application file for complete search history.

(56) References Cited

U.S. PATENT DOCUMENTS

| | | | | |
|---|---|---|---|---|
| 1,794,658 A | * | 3/1931 | Walsh | A01D 57/10 56/219 |
| 2,670,586 A | * | 3/1954 | Phillips | A01D 57/10 56/158 |
| 2,832,187 A | * | 4/1958 | Johnson | A01D 57/10 56/220 |
| 3,094,829 A | * | 6/1963 | Reinhold | A01D 41/02 56/16.5 |
| 3,125,843 A | * | 3/1964 | Nodini | A01D 41/1252 454/64 |
| 3,165,874 A | * | 1/1965 | Osteen | A01D 57/10 56/12.9 |
| 3,187,491 A | * | 6/1965 | Karlsson | A01D 41/1252 56/13.3 |
| 3,213,598 A | * | 10/1965 | Olsson | A01D 41/1252 56/16.5 |
| 3,665,687 A | * | 5/1972 | Hatton | A01D 43/077 56/12.9 |

(Continued)

FOREIGN PATENT DOCUMENTS

| | | | | |
|---|---|---|---|---|
| DE | 1582206 A1 | * | 5/1970 | ......... A01D 41/1252 |
| DE | 102018002197 A1 | * | 9/2019 | ......... A01D 41/1252 |

(Continued)

*Primary Examiner* — Arpad F Kovacs
(74) *Attorney, Agent, or Firm* — Hamilton IP Law, PC.; Jay R. Hamilton

(57) ABSTRACT

A combine crop trash removal system for mounting to a combine corn harvester using hydraulically driven air blowers coupled to the combine header control system for reduction and/or removal of stalks, leaves, dirt and dust type material from accumulating on the combine feeder house and obscuring the operators view of the operating combine header during operation of the combine harvester for corn picking. The air blower may also be driven electrically or pneumatically. The operator of the combine harvester controls the crop trash removal system from the operator cab of the combine harvester.

4 Claims, 13 Drawing Sheets

(56) References Cited

U.S. PATENT DOCUMENTS

| | | | | |
|---|---|---|---|---|
| 3,796,511 A * | 3/1974 | Hansen | F04D 29/701 | 415/206 |
| 3,828,531 A * | 8/1974 | Quick | A01D 57/10 | 56/12.9 |
| 3,961,465 A * | 6/1976 | Winings | A01D 75/02 | 56/16.5 |
| 4,303,373 A * | 12/1981 | Polhemus | A01D 57/10 | 415/206 |
| 4,406,112 A * | 9/1983 | Brooks | A01D 57/10 | 56/12.9 |
| 4,430,849 A * | 2/1984 | Wilson | A01D 46/04 | 56/16.6 |
| 4,462,750 A * | 7/1984 | Sugawara | F04D 17/04 | 415/53.3 |
| 4,730,444 A * | 3/1988 | Leffel | A01D 45/30 | 56/12.9 |
| 5,134,837 A * | 8/1992 | Casey | A01D 57/10 | 56/130 |
| 5,322,472 A * | 6/1994 | Little | A01D 41/1252 | 460/119 |
| 6,036,600 A * | 3/2000 | Kruckman | A01D 41/1252 | 460/117 |
| 8,062,109 B1 * | 11/2011 | Pearson | A01D 41/1252 | 460/59 |
| 8,920,226 B2 * | 12/2014 | Duquesne | A01F 12/16 | 460/105 |
| 9,295,197 B1 * | 3/2016 | Veikle | A01F 12/46 | |
| 9,579,692 B2 * | 2/2017 | Le Nevé | A23L 19/03 | |
| 9,668,408 B2 * | 6/2017 | Bosquet | A01D 57/10 | |
| D888,108 S * | 6/2020 | Loggan | D15/33 | |
| D895,688 S * | 9/2020 | Wagner | D15/26 | |
| 10,986,777 B2 * | 4/2021 | Ricketts | A01F 12/48 | |
| 11,291,160 B2 * | 4/2022 | Neela | A01D 61/008 | |
| 2016/0157433 A1 * | 6/2016 | Stahl | A01F 12/444 | 460/100 |
| 2019/0159404 A1 * | 5/2019 | Matousek | A01F 12/56 | |
| 2019/0357437 A1 * | 11/2019 | Neela | A01D 61/008 | |
| 2020/0060093 A1 * | 2/2020 | Matousek | A01F 12/444 | |

FOREIGN PATENT DOCUMENTS

| | | | | |
|---|---|---|---|---|
| JP | 2003174815 A * | 6/2003 | | A01D 67/00 |
| JP | 2012044879 A * | 3/2012 | | A01D 61/00 |
| KR | 20050079615 A * | 8/2005 | | A01D 61/00 |

* cited by examiner

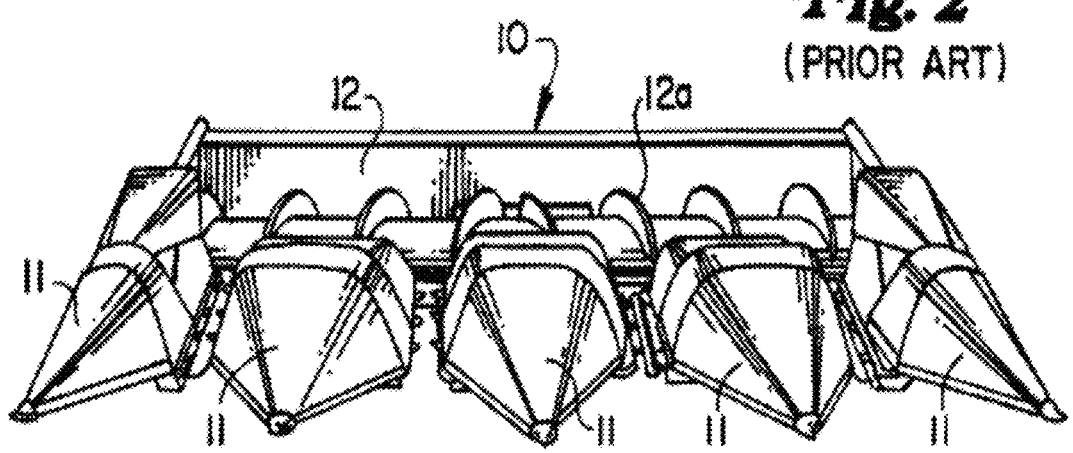
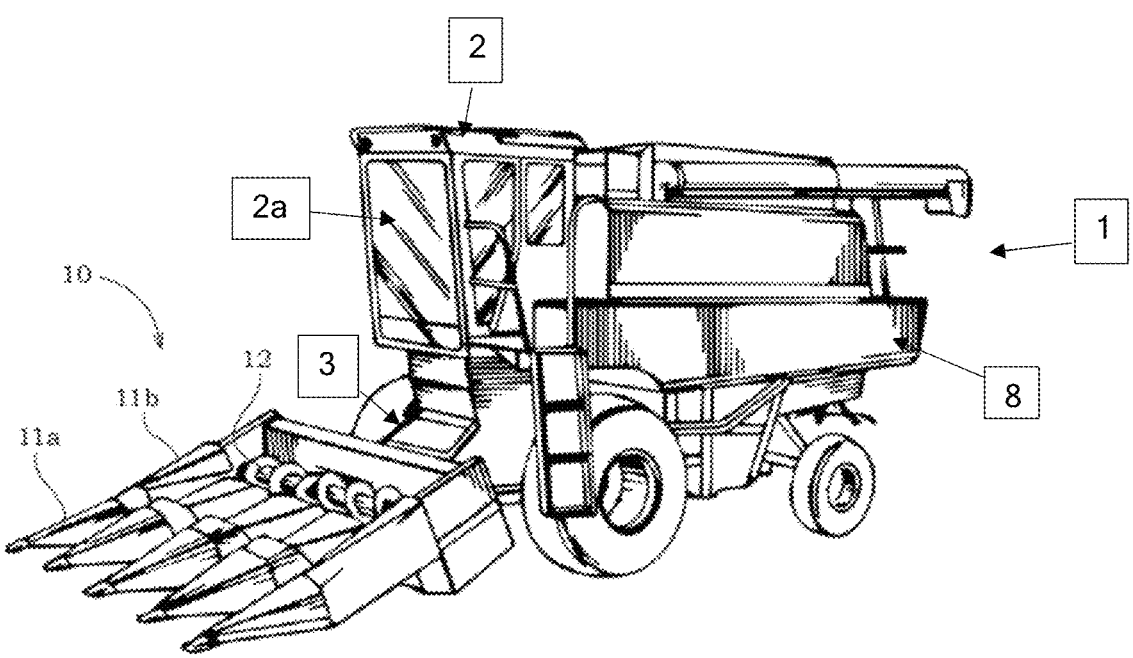
FIG. 3 PRIOR ART

COMBINE CROP TRASH REMOVAL SYSTEM

CROSS REFERENCE TO RELATED APPLICATIONS

This nonprovisional utility patent application claims priority from provisional U.S. Pat. App. No. 62/820,457 filed on Mar. 19, 2019, which is incorporated by reference herein in its entirety.

FIELD OF THE INVENTION

The apparatus described herein is generally applicable to the field of agricultural equipment. The embodiments shown and described herein are more particularly for improved harvesting of small grain crops including without restriction or limitation corn, soybeans, wheat and oats wherein leaves, stalks, dirt and dust (also known as "crop trash") may accumulate on the combine feederhouse thereby impeding or obstructing operator use of and access to the combine head during small grain harvest.

STATEMENT REGARDING FEDERALLY SPONSORED RESEARCH OR DEVELOPMENT

No federal funds were used to develop or create the disclosed invention.

REFERENCE TO SEQUENCE LISTING, A TABLE, OR A COMPUTER PROGRAM LISTING COMPACT DISK APPENDIX (Not Applicable)

AUTHORIZATION PURSUANT TO 37 C.F.R. § 1.171 (d)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

This invention relates to small grains harvesting machinery and more particularly the header unit (the "header") commonly used with modern self-propelled combine harvesters for intake and the feederhouse of the self-propelled combine harvester for transfer of the raw grain material to the threshing system. Modern combine harvester operation is fairly well known in the prior art, as demonstrated by the following U.S. Patents which are incorporated by reference herein: U.S. Pat. Nos. 3,669,122; 3,945,178; 4,178,943; 4,450,671; 4,663,921; 5,445,563 and 7,070,498.

Accordingly, it is not necessary for applicant to call-out or illustrate every element of a combine harvester that the present invention may work with and instead applicant seeks to define the major combine harvester systems in general terms that do no necessitate calling out each particular element, unless shown in the accompanying figures and relevant to the invention as disclosed. As taught and understood, the header is positioned at the anterior of the combine harvester and connected to the combine harvester. As understood by one of ordinary skill in the prior art, the header 10 is configured to process, collect and transport a quantity of raw grain material for intake into the combine harvester. As understood by one of ordinary skill in the prior art, the feederhouse is connected to and aft of the header and positioned at the anterior of the combine harvester. The feederhouse is configured for transporting the quantity of raw grain material via a powered paddle or conveyer system (not shown but understood) into the threshing system (not shown) of the combine harvester. Generally, as understood in the prior art and described further herein, the threshing system has an inlet configured to receive and process the quantity of raw grain material conveyed through the feederhouse (not shown but understood). In the threshing system, a clean grain outlet will discharge or remove any clean grain separated by the threshing system from the raw grain material. As discussed further herein, in at least one configuration of a combine harvester, the clean grain is conveyed from the threshing system via a clean grain elevator for collection in a clean grain tank. The non-grain material the threshing system is then discharged from its outlet. This non-grain material is commonly known as "tailings" is discharged onto the ground behind the combine harvester. Also as generally shown in the prior art figures herein, a modern self-propelled combine harvester has an operator cab which is positioned aft of the header and the feederhouse. As is known and understood, the operator cab is configured to allow an operator to operate the combine harvester via the major systems of the combine harvester which may include the header, the feederhouse (intake to threshing system), the threshing system, the power system (including but not limited to the engine, header, transmission, wheel or track drive(s)), the electrical system (including but not limited to the lights, radio, sensors, monitors, etc.), clean grain tank unloading system, and the hydraulic system (including but not limited to the speed of the header or reel operation, the position of reel or header in relation to the ground). The operator is typically seated in the operator cab and positioned with a view of the header and an exterior portion of the feederhouse connected to the header via the front glass of the operator cab. From the operator cab, the operator has access to the operations control system, which is typically configured to allow an operator to control at least the combine harvester header, the feederhouse and the threshing system from the operator cab but typically would allow control of any and all of the aforementioned combine harvester systems. The combine harvester typically has a frame assembly which allows for the interconnection and support of the header, the feederhouse, the threshing system, the operator cab, the operations control system(s) and power system(s) to operate the combine harvester for processing (picking) raw grain material which may include corn or other small grain crops including soybeans, wheat and oats or similar, without limitation or restriction.

SUMMARY OF THE INVENTION

Several factors have impacted corn harvesting including: 1) corn stalk harvest heights have continued to increase; (2) corn yields have doubled through improved genetics, fertilization, populations, and row spacings; 3) genetics have also improved insect resistance, which improved plant health, stalk vigor, and increased height at harvest time; and, harvesting machines are larger with increased horsepower, capacity, ground speed and utilize corn heads with more row units. Together these factors result in a large amount of material produced by the corn head during separation of the ear of corn from the corn plant stalk. The objective of the corn head is to retain mostly the ears of corn via the corn head into the combine "feederhouse" during operation with the material other than ears (MOTE) to be ejected by the row head. Combine operators commonly refer to this mass of material as "trash", "muskrat huts", "hair ball", or simply "a pile of fluff". Many times this material will include dirt and or dust which will agglomerate and accumulate on the surfaces of the combine harvester, the combination of materials sticking to the surfaces. In this application, this combination of material will hereinafter be referred to as "crop trash". Accumulation of crop trash in and around the combine head and feederhouse can obscure the operator's view and access to the corn header. Many times operators claim this accumulation of trash or fluff will occur during the best operating times of the day. This is especially the case when the corn is extremely dry as may be found on fall afternoons with low humidity. The appearance and accumulation of this fluff or trash may be severe enough to require harvesting equipment to shut down for removal of the crop trash accumulated on the feederhouse in and around the header. Removal of the crop trash is an objective of the combine crop trash removal system and method disclosed herein.

In at least one embodiment of the invention, the elements comprising the crop trash removal system 30 may be integrated into the various systems of a typical combine harvester as discussed herein. In another embodiment of the invention, the crop trash removal system 30 may be implemented as a kit or modification to an existing combine harvester. In another embodiment of the invention, the removal of crop trash from the upper exterior portion of the feederhouse 3a may be practiced as a method with either an existing combine harvester or integrated into combine harvester from the factory.

As disclosed and discussed, without limitation or restriction, in at least one embodiment of the invention, it may be implemented with a pair of hydraulically powered air blowers positioned upon or proximate harvester header, the discharge of each powered blower positioned proximate the upper exterior portion of the harvester feederhouse to reduce and or remove crop accumulated upon the feederhouse and or the harvester header upon actuation of the powered air blower. As shown herein, without limitation or restriction, the powered blowers may be hydraulically connected to the combine harvester system and actuation of the powered air blowers is controlled/controllable using the harvester system controls located within the cab of the harvester by the operator of the harvester. In another embodiment, a hydraulically powered blower is attached to a mount which is configured for attachment to and between the air blower and the combine harvester. A blower airline having an inlet and an outlet is connected to the air blower for delivering a high pressure air stream from the air blower to the blower airline outlet.

The blower airline outlet is positioned proximate to the exterior portion of the feederhouse of the combine harvester, just aft of the operator cab in front of the window. The air blower control system is connected to the combine harvester hydraulic so that the operator may engage the air blower to deliver a high-pressure air stream to the exterior portion of the feederhouse to remove any accumulation of trash positioned therein during harvest operations. Applicant has found through testing and experimentation that further operational improvements are gained by positioning the air blower within the outer body shields of the combine harvester and attaching the air blower proximate the clean grain elevator and the underside of the clean grain tank to shelter the air blower and improve its longevity.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limited of its scope, the invention will be described and explained with additional specificity and detail through the use of the accompanying drawings.

FIG. 2 is a front view of a corn header, the cross auger, the cross-auger trough, the feederhouse, and the gathering chains of FIG. 1, as disclosed in the prior art.

FIG. 3 is a perspective view of a typical corn header as shown in FIG. 2 attached to a typical combine harvester.

DETAILED DESCRIPTION—ELEMENT LISTING

Figure 1A:
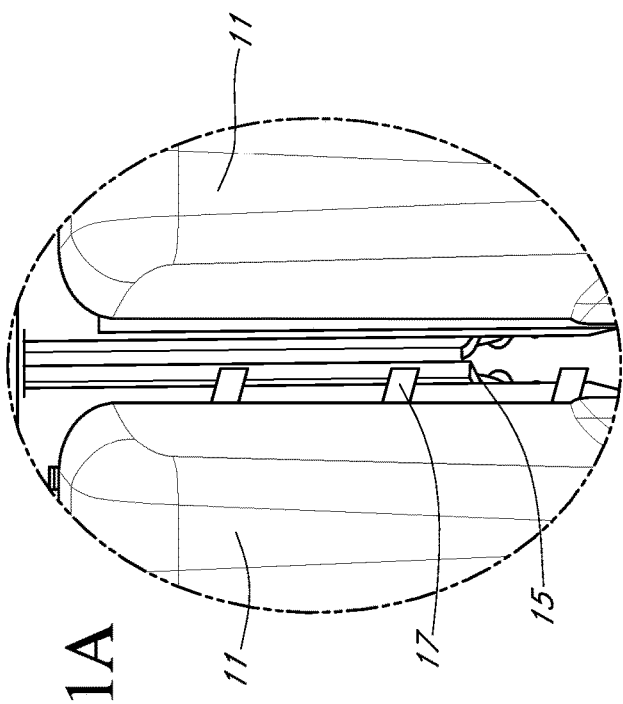
FIG. 1A is an exploded top view of a portion of one row unit of FIG. 1 of the prior art corn head showing a portion of the stalk rolls for corn plant engagement.

| ELEMENT DESCRIPTION | ELEMENT # |
|---|---|
| Combine harvester | 1 |
| Cab | 2 |
| Feederhouse | 3 |
| Upper exterior portion of Feederhouse | 3a |
| Clean grain elevator | 4 |
| Grain tank | 5 |
| Grain tank cross auger | 5a |
| Combine harvester hydraulic system | 6 |
| Combine harvester body shields | 8 |
| Light | 9 |
| Header | 10 |
| Row divider | 11 |
| Cross auger trough | 12 |
| Cross auger | 12a |
| Drive shaft (header) | 13 |
| Stalk roll | 15 |
| Gathering chain paddle | 17 |
| Gathering chain | 18 |
|  | 19 |
| Crop Trash (corn stalks, leaves, husks, cob, grain, dirt, dust) | 20 |
|  | 21 |
| Operator in Cab | 27 |
|  | 28 |
| Combine harvester direction of travel | 29 |
| Combine Trash Removal System and Method | 30 |
| Air Blower(s) | 31 |
| Mount | 32 |
|  | 33 |
| Blower airline | 34 |
| Blower airline - inlet | 34a |
| Blower airline - outlet | 34b |
|  | 38 |
|  | 39 |
| Hydraulic system - blower | 40 |
| Hydraulic system motor | 41 |
| Hydraulic block | 42 |
| Hydraulic control line(s) - blower | 43 |

DETAILED DESCRIPTION

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes—from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

Before the various embodiments of the present inventions are explained in detail, it is to be understood that the present invention is not limited in their application to the details of applications and/or parameters set forth in the following description or illustrated in the drawings. The present invention is capable of other embodiments and of being practiced or of being carried out in various ways. Operational parameters included herein are for illustrative purposes only, and in no way limit the scope of the present invention. The following detailed description is of the best currently contemplated modes of carrying out illustrative embodiments of the invention.

Figure 1:
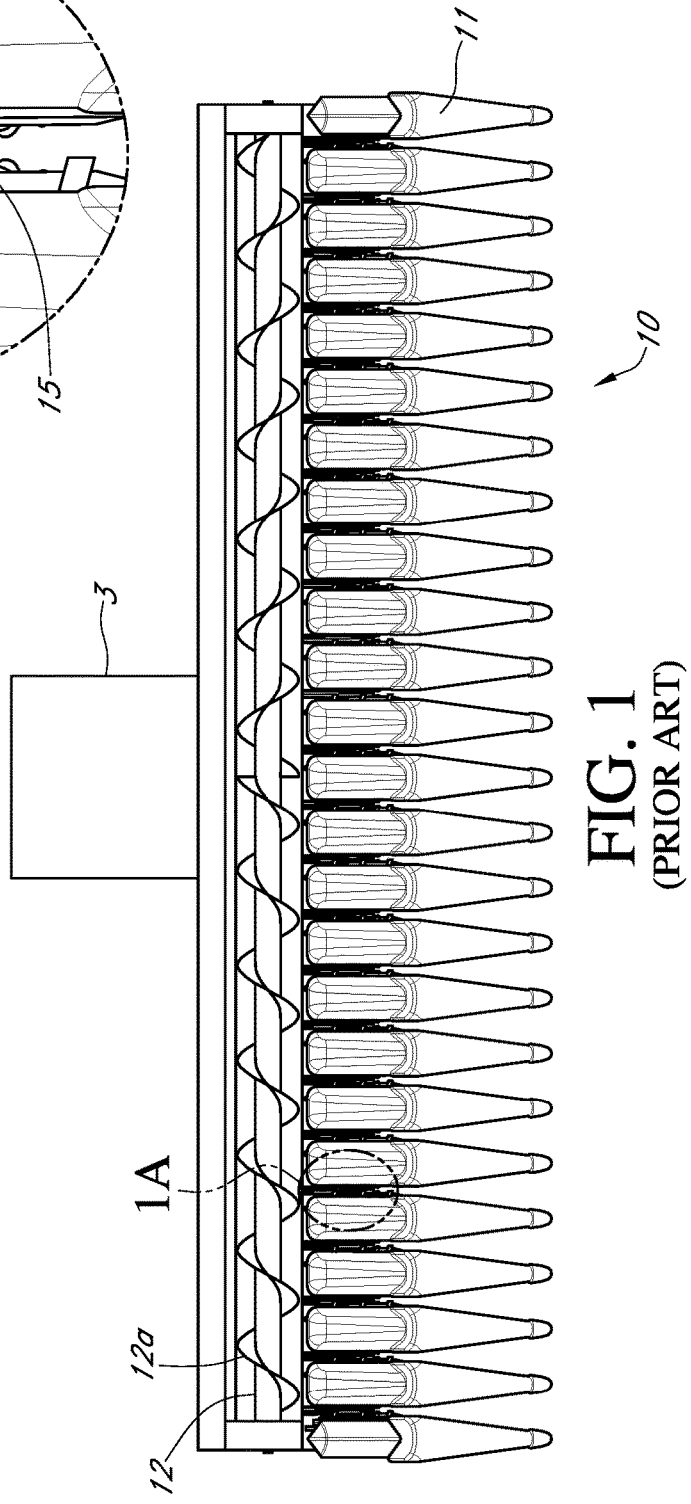
FIG. 1 is a top view of one embodiment of a prior art corn head that contains a cross auger, a feederhouse, a frame, and multiple row units.

Referring now to the drawings, wherein like reference numerals designate identical or corresponding parts throughout the several views, the general operation of corn heads (header) 10 as illustrate in FIGS. 1-2 corn heads using stalk rolls 15 of the prior art for attachment to a harvester 1. As used herein, "left" and "right" are defined from the perspective of a corn plant with respect to a harvesting machine.

Figure 4:
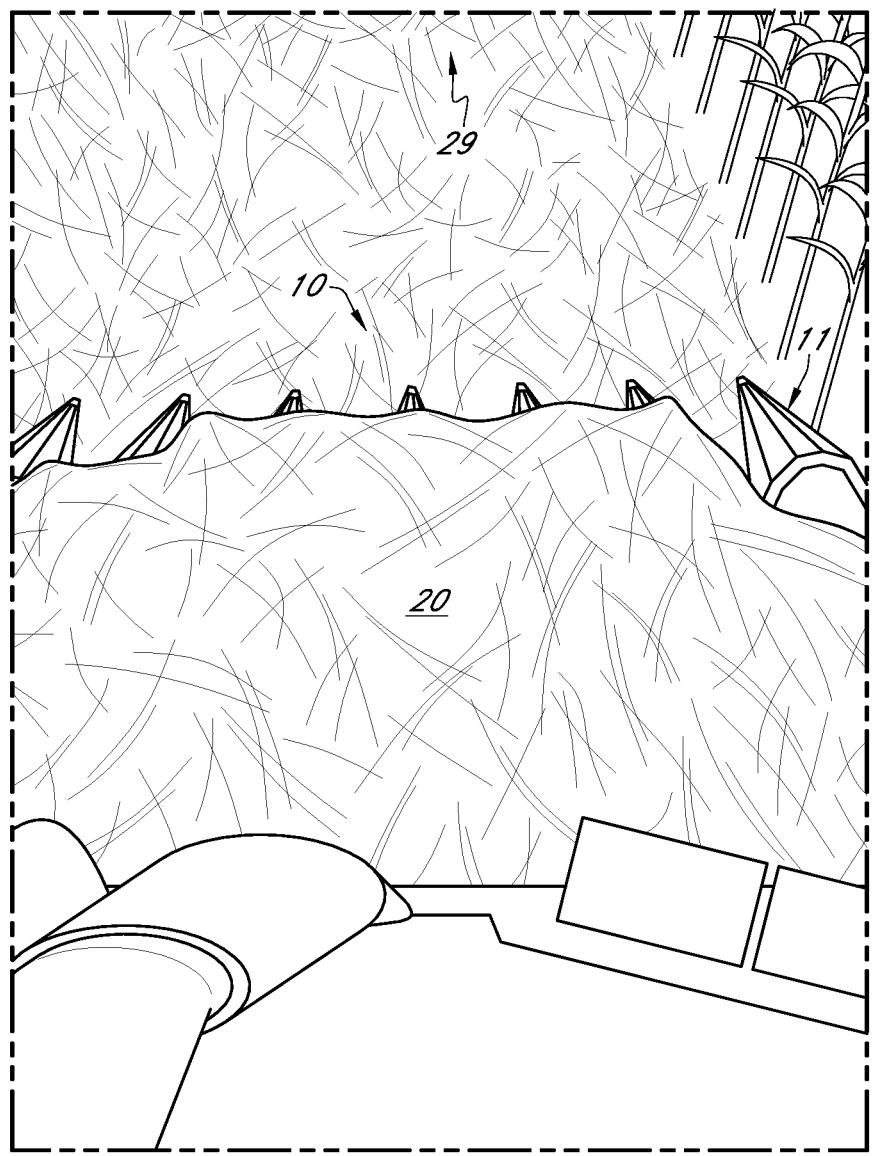
FIG. 4 is a top view of a harvester feederhouse proximate the corn header from the perspective of the harvester combine operator in the cab wherein the upper exterior portion of the feederhouse 3a is covered by crop trash 20 which is typically a mixture of corn stalks, corn ears, cobs, grain kernels, leaves, dirt and or dust which accumulates and agglomerates thereby obscuring the operator's view and interfering with harvesting operations.

The power source for the header 10 is provided from a stalk roll drive shaft 13 through a gearbox as described in the prior art and is well known to those skilled in the art and not pictured herein. Each corn head row unit on the corn header is provided with pairs of stalk rolls 15 arranged parallel and opposing to the other. Corn headers employing stalk rolls 15 of the prior art pull the corn stalk in a downward motion, causing the ears to contact the stripper plates and separate from the stalk. The flutes or knives of the stalk rolls 15 typically lacerate or crush the stalk to facilitate ejection of the stalk from the corn plant. Gathering chain paddles affixed to the row unit gathering chains 17 transport the loose ears to the cross auger trough 12a. The cross auger 12 moves the ears from the cross-auger trough to the feederhouse 3, which moves the ears into the remainder of the harvester 1 for further processing, all of which is well known to those skilled in the art, as previously discussed in the invention background. The preceding process, for harvesting corn or any small grain, produces a tremendous amount of debris compromised of stalks and leaf residue (crop trash 20) which as shown in FIG. 4, may accumulate on the upper exterior portion of the feederhouse 3a thereby obscuring the operator's view of the header and interfering with the harvesting operation due to plugging. Further, accumulation of crop trash increases fire risk and reduces operator access to the header 10 and/or harvester for maintenance and/or repair.

As shown in FIG. 1, corn heads (aka headers 1) are provided with several row crop dividers for retrieving, lifting, and directing the rows of corn stalks toward their respective ear separation chambers. FIG. 1A shows a top isolated view of the row crop divider and more particularly the gathering chains and stalk rolls of the corn row unit as typically found in the prior art. Corn heads include individual row units normally designed for harvesting a single row of crop material. Each row unit contains a row crop divider, a row unit hood, gathering/conveying chain(s), two stripper plates, two stalk rolls, a row unit frame, and a gearbox. The gearbox powers the row unit for gathering corn plants then stripping, separating, and conveying ears of corn from the corn plant. FIG. 2 is a front view of a typical corn header as shown in FIG. 1.

FIG. 3 is a perspective view of a typical combine harvester 1 and header 10. During operation the stalk rolls are powered by a gearbox. As the stalk rolls rotate, the flutes on the stalk rolls pull the corn stalk downward. Two stripper plates located above the stalk rolls and on both sides of the corn row are spaced wide enough to allow to the corn plant to pass between them but narrow enough to retain the ear of corn which contain grain. This causes the ears of corn to be separated from the corn plant as it is pulled downward through the stripping plates. The stalk rolls continue to rotate ejecting the unwanted portions of the corn plant below the corn head thereby returning the unwanted portions to the field.

FIG. 4 is a top view of a harvester feederhouse 3 proximate the corn header 1 from the perspective of the harvester combine operator in the cab 27 wherein the upper exterior portion of the feederhouse 3a is covered by crop trash 20 which is typically a mixture of corn stalks, corn ears, cobs, grain kernels, leaves, dirt and or dust which accumulates and agglomerates thereby obscuring the operator's view and interfering with harvesting operations.

Figure 5:
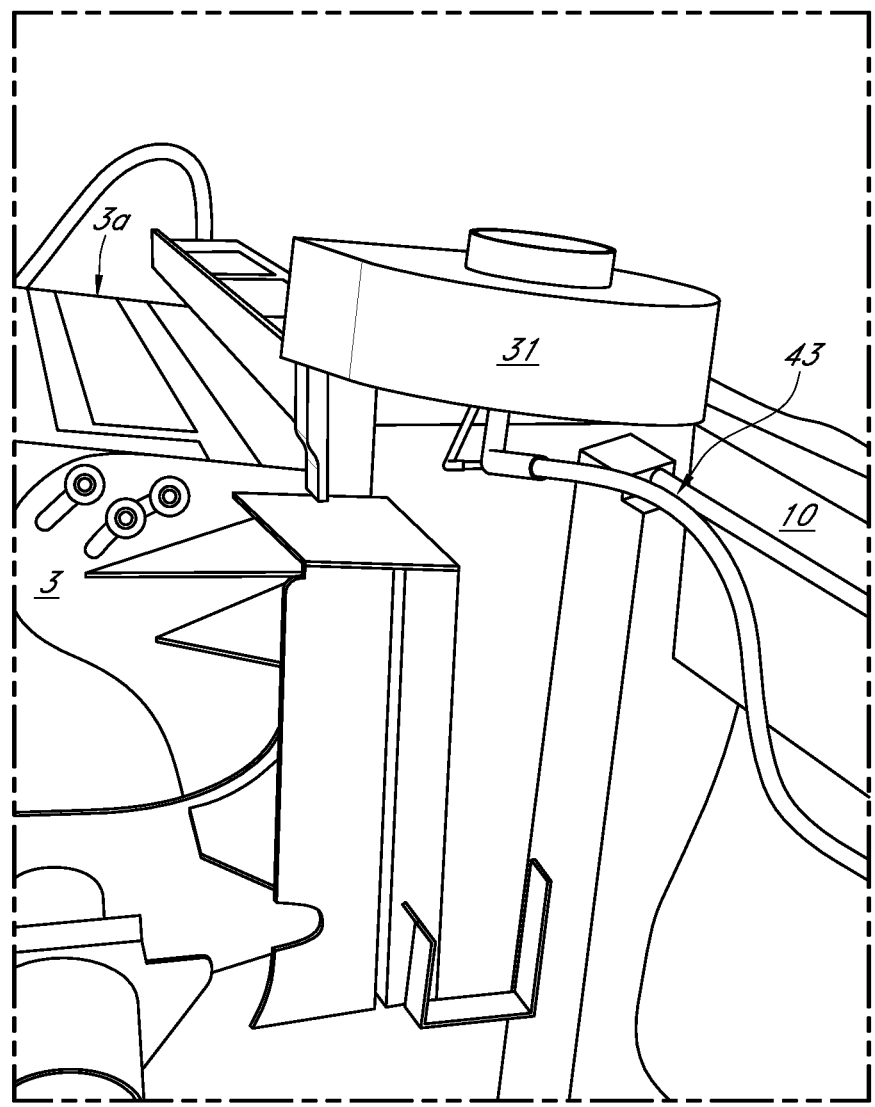
FIG. 5 is a side view of one embodiment of the combine crop trash removal system and method as disclosed herein as positioned on the corn header of the combine harvester.

FIG. 5 is a side view of one blower 31 of the Combine Trash Removal System and Method 30 as disclosed herein as positioned on the left side of the corn header 10 attached to the harvester 1.

Figure 6:
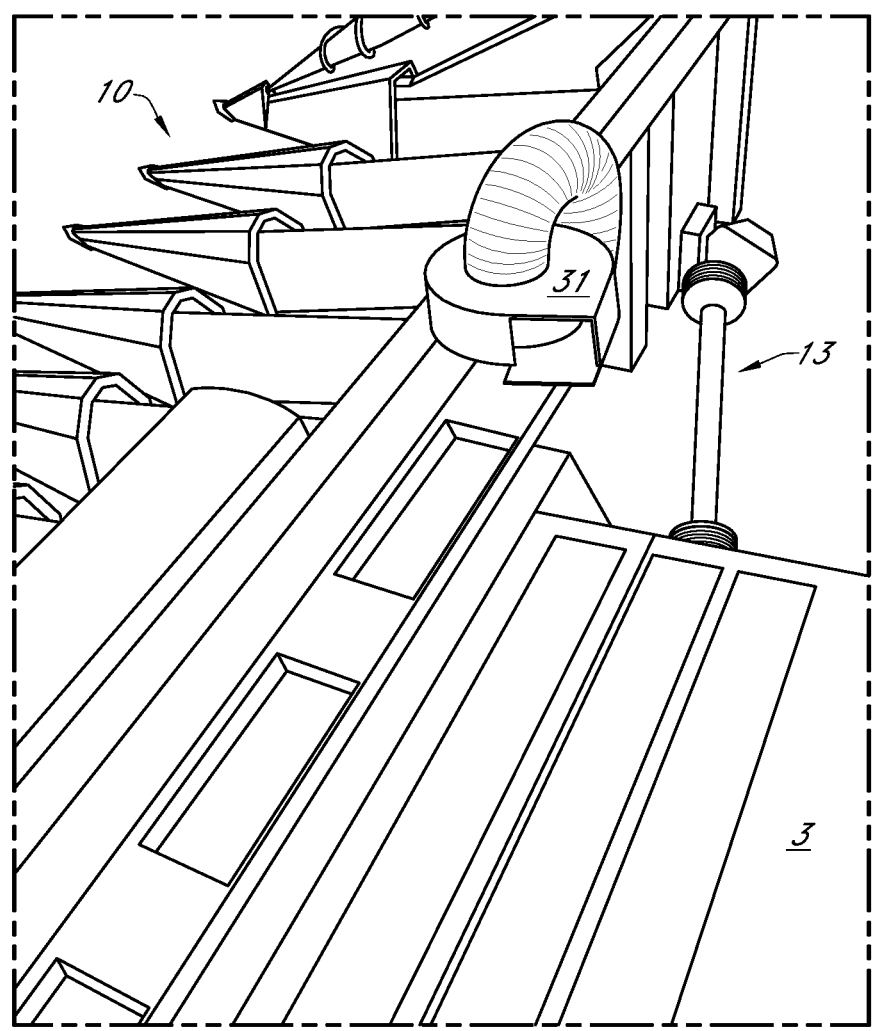
FIG. 6 is a top perspective view of the combine crop trash removal system and method as disclosed herein as positioned on the corn header of the harvester as directed at the upper exterior portion of the feederhouse of the combine harvester.

FIG. 6 is a top perspective view of the Combine Trash Removal System and Method 30 as disclosed herein as positioned on the corn header 10 attached to the harvester 1 and as directed at the feederhouse 3 of the harvester.

As illustrated in the FIGS. 5 and 6, the combine trash removal system and method 30 comprises least one powered blower 31 having the discharge of the at least one powered blower positioned proximate the harvester feederhouse 3 to reduce and or remove crop trash 20 which includes stalks, leaves and husks accumulated upon the upper exterior portion of the feederhouse 3a and or the harvester header 10 upon actuation of the powered blower 31. As illustrated, the combine crop trash removal system and method 30 in at least one embodiment includes at least one powered blower 31 positioned on the combine header 10 (frame). One of ordinary skill will appreciate that the combine trash removal system and method 30 has the controls of the powered blower 31 integrated into the harvester power and control systems, which is illustrated herein via the harvester hydraulic system 40. As shown, the air blower 31 of the combine crop trash removal system and method 30 is hydraulically powered or driven and controlled via hydraulic lines 43 connected to the harvester hydraulic system 6 (not shown) as further discussed herein. One of ordinary skill will appreciate that although illustrated with a hydraulic motor 41 the blower 31 could also be mechanically driven via a drive shaft (not shown), pneumatically driven with air (not shown) and or electrically driven via an electrically powered motor, all of which are well known in the prior art for driving an air blower and are typically part of the operating systems of a combine harvester 1. Although not shown, one of ordinary skill will also appreciate that the combine trash removal system and method 30 may be configured with either one blower positioned proximate the feederhouse 3 or with multiple blowers (not shown) 31. In another embodiment, the combine trash removal system and method 30 could be configured with a pair of hydraulically powered blowers positioned upon on the harvester header 10, the discharge of each powered blower 31 positioned proximate the harvester feederhouse 3 to reduce and or remove trash 20 which includes stalks, leaves and husks accumulated upon the feederhouse 3 and or the harvester header 10 upon actuation of each of the powered blower 31, wherein the powered blowers 31 are hydraulically connected to the harvester 1 and actuation of the powered blowers 31 is controllable using the harvester controls located within the cab of harvester by the operator of the harvester. Although not shown, one ordinary skill will appreciate that the at least one blower 31 may be integrated into the harvester 1 and its controlled systems allowing discharge upon the feederhouse 3 of the harvester without interference or integration with the header 10. The harvester power and control systems could include, without restriction or limitation therein, mechanical, electrical, pneumatic, electrical and or electronic, and combinations therein.

Figure 7:
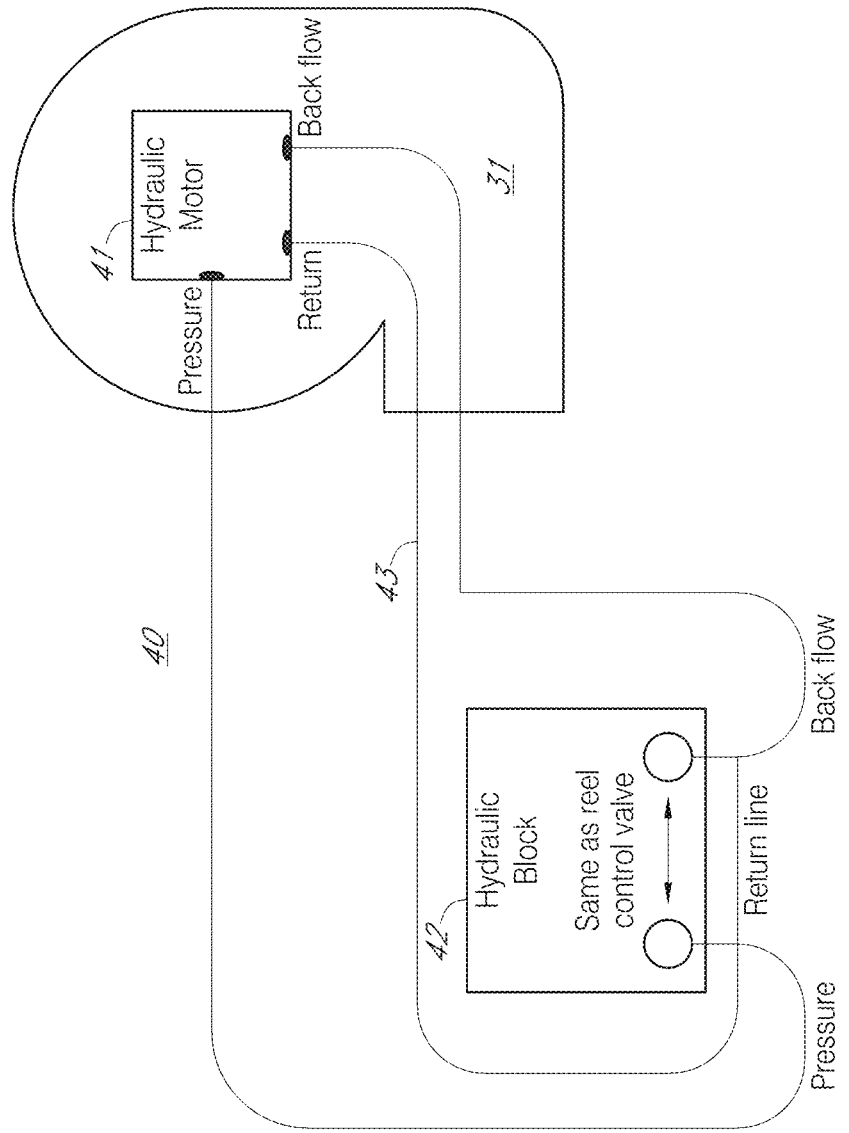
FIG. 7 is simplified flow diagram of the hydraulic control system 40 for the combine crop trash removal system and method 30 as disclosed herein.
Figure 8:
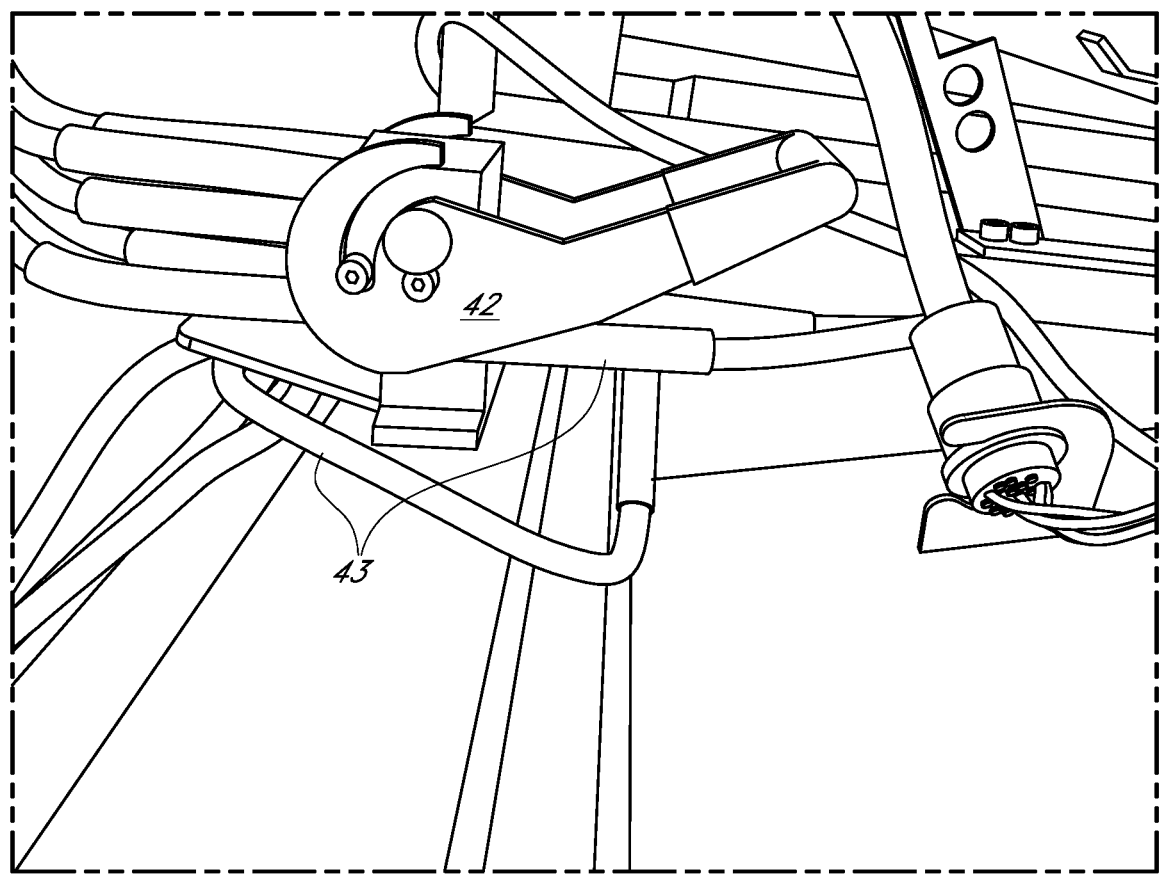
FIGS. 8 and 9 provide additional views of the hydraulic control system 40 for the combine trash removal system and method 30 and particularly the hydraulic block 42 arrangement of control valves and hydraulic lines 43 of the header control.
Figure 9:
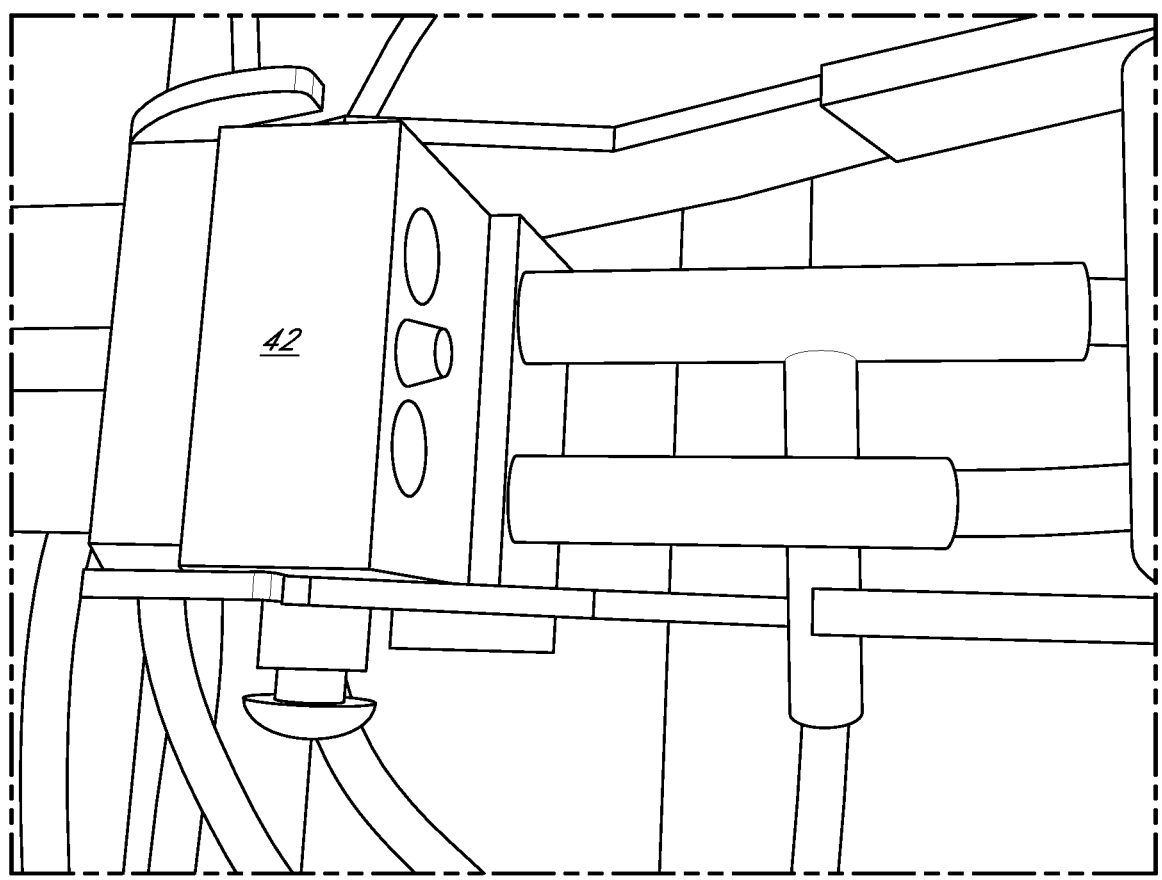

FIG. 7 is simplified flow diagram of the hydraulic control system 40 for the combine crop trash removal system and method 30 as disclosed herein. FIGS. 8 and 9 provide additional views of the hydraulic control system 40 for the combine crop trash removal system and method 30 and particularly the hydraulic block 42 arrangement of control valves and hydraulic lines 43 of the header control. As illustrated by FIGS. 7-9, the combine crop trash removal System and method 30 may be configured to be hydraulically powered and controlled via the hydraulic system 40. As shown and disclosed, the blower 31 may be driven by a hydraulic motor 41 hydraulically connected to the harvester hydraulic system 6 via hydraulic control lines 43 at the hydraulic block 42, which is the same system used to control the reel speed on this particular configuration of harvester. One of ordinary skill will appreciate there are other points of connection and methods which would be satisfactory to drive the Combine Trash Removal System and Method 30, configured for hydraulic control or via other methods previously discussed, without departure from the spirit and intent of this disclosure.

Figure 10:
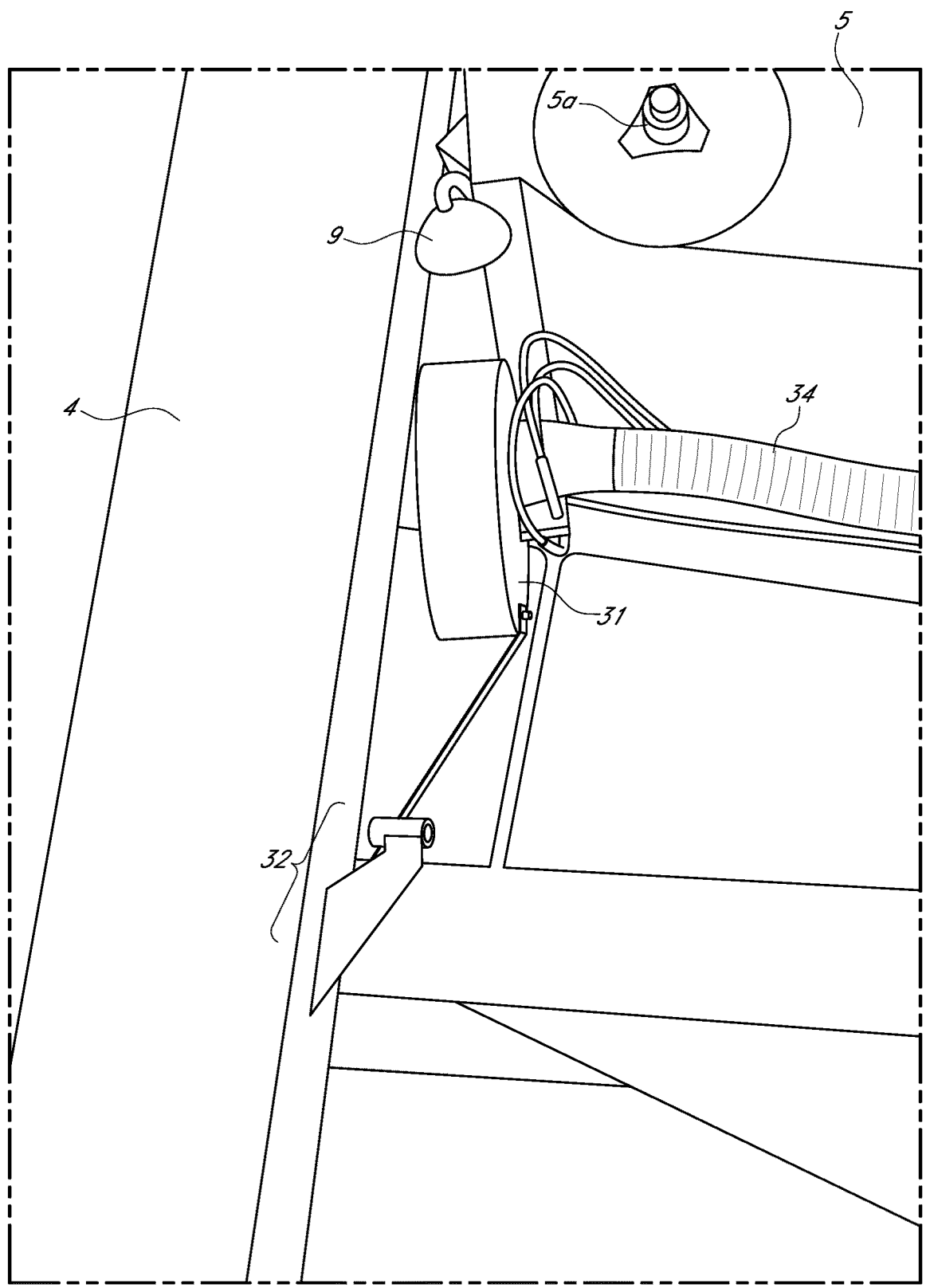
FIG. 10 is a perspective view of another embodiment of the combine crop trash removal system and method having a hydraulic system for the air blower wherein the air blower is mounted on the combine adjacent the clean grain elevator and behind the combine shields.
Figure 10A:
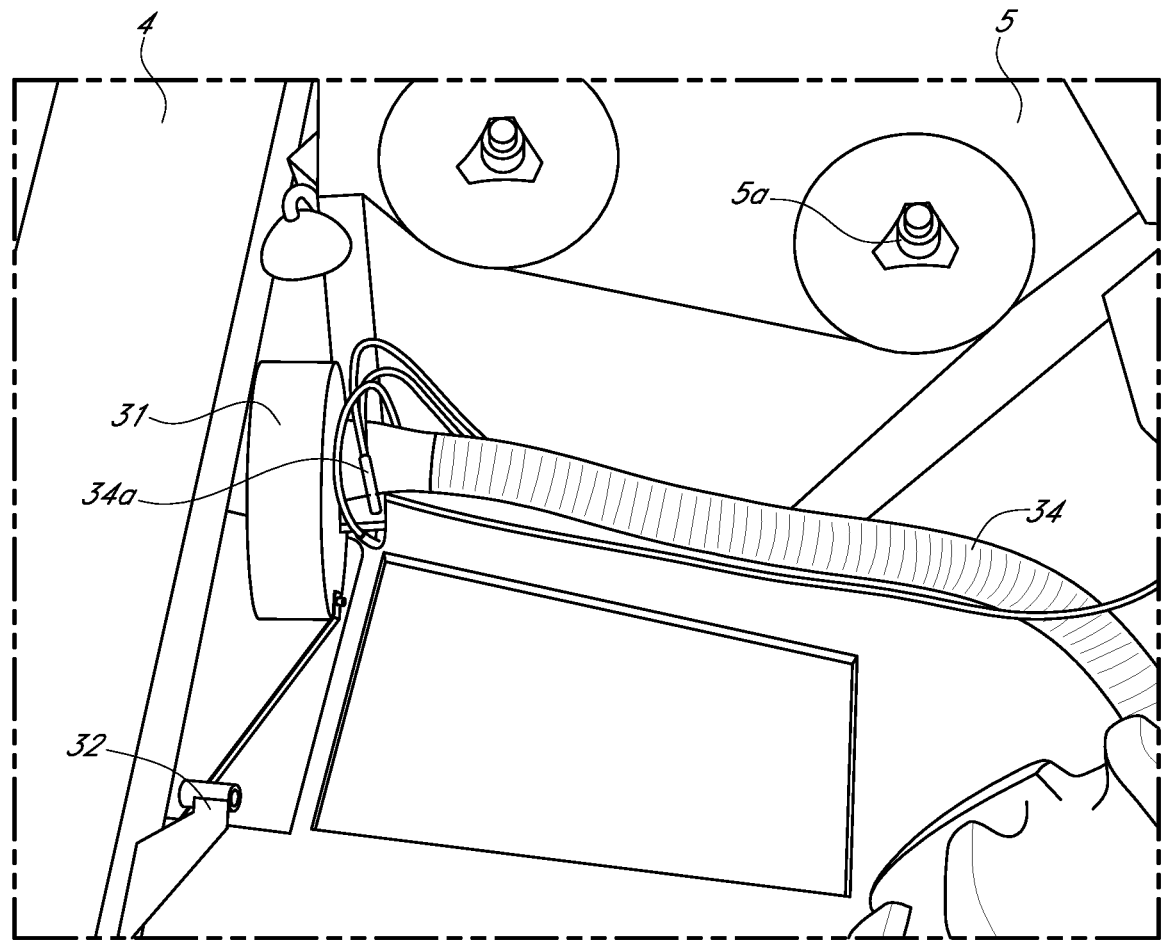
FIG. 10A is another perspective view of another embodiment of the combine crop trash removal system and method having a hydraulic system for the blower as disclosed in FIG. 10.
Figure 11:
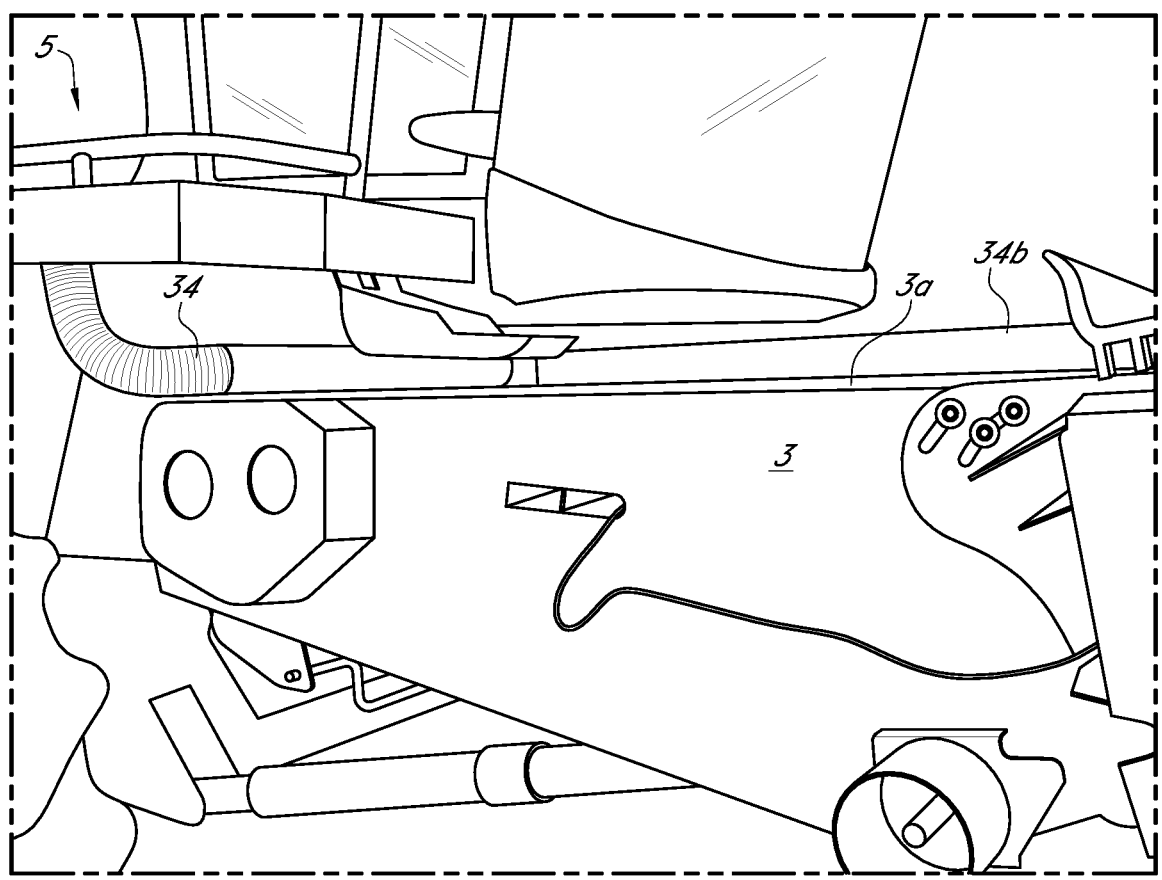
FIG. 11 is a side view of the combine crop trash removal system and method as disclosed herein.

In another embodiment, as shown in FIGS. 10-13, the combine crop trash removal system and method 30 has been configured so as to remove or reduce plugging of the blower 31. As shown in FIGS. 10 and 10A the blower 31 is now affixed to the combine harvester 1 via mount 32 adjacent the clean grain elevator 4 and behind the combine shields 8. Mount 32 is configured as an angle iron bracket but could be configured in any manner suitable for attachment of an air blower 31 to the combine harvester 1 as known to one of ordinary skill in the arts including without limitation or restriction a combination of fasteners such as bolts, nuts and/or washers as well as brackets (not shown) without departure from the spirit of the present patent application. FIG. 11 illustrates a side view of the combine crop trash removal system and method 30 the relationship between the cab 2, the window of the cab 2a and the upper portion of the feederhouse 3a. As shown, the air blower line 34 extends out and is positioned to rest upon the upper portion of the feeder house 3a with the blower line 34 terminating at the header 10. As shown in this configuration the outlet of the air blower line 34b allows the high pressure air stream to blow across the upper portion of the feederhouse 3a to remove crop trash 20.

Figure 12:
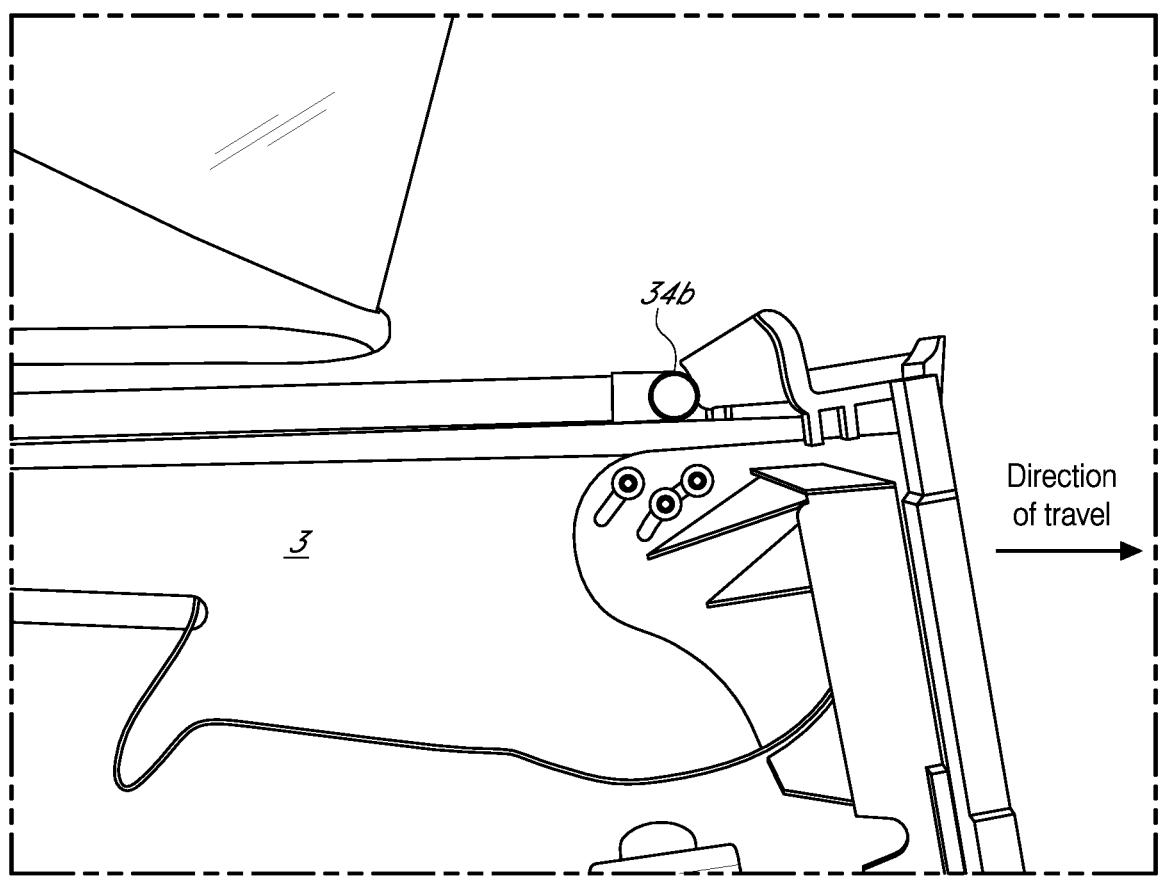
FIG. 12 is a side view of the combine crop trash removal system and method and particularly the feederhouse as shown in FIG. 11 with the combine header removed.

FIG. 12 is a side view of the combine trash removal system and method 30 and particularly the feederhouse 3 as shown in FIG. 11 with the combine header 10 removed. FIG. 12 provides an exemplary view of the blower airline outlet 34b positioned at the end of the blower airline 34 positioned on the upper portion of the feederhouse 3a to best remove materials that accumulate on the upper exterior portion of the feederhouse 3a as illustrated in FIG. 4.

Figure 13:
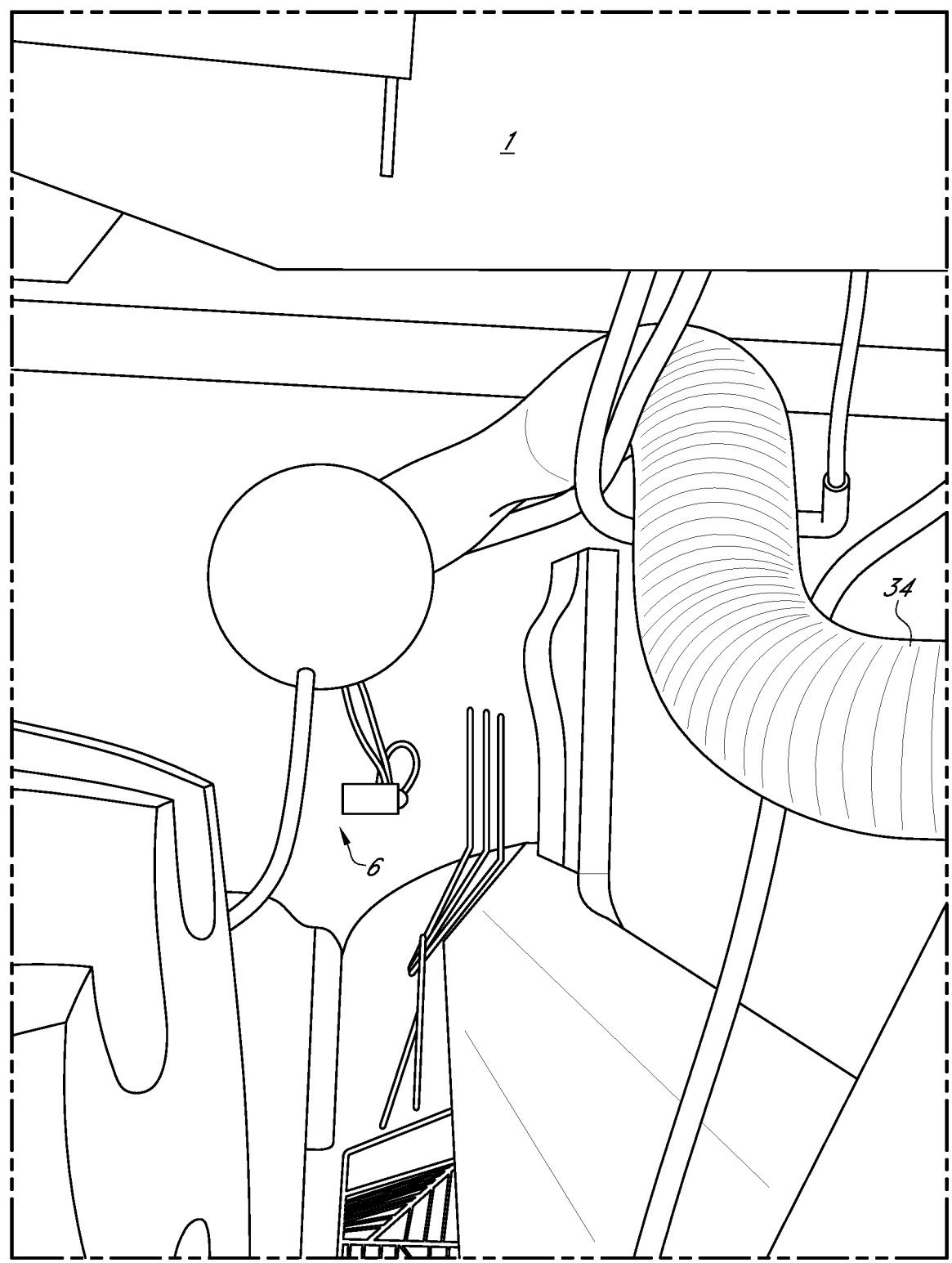
FIG. 13 is a view of the side of the combine hydraulic system, the air blower line of the crop trash removal system as positioned on the clean grain side of the combine, behind and to the side of the feederhouse.

FIG. 13 is a view of the side of the combine hydraulic system 6, the hose (air blower line) 34 of the trash removal system 30 as positioned on the clean grain elevator 4 side of the combine harvester 1, behind and to the side of the feederhouse 3. In addition to reducing plugging of the blower 31, this particular configuration reduces complexity and complications when removing the header 10 from the combine 1 as the combine trash removal system 30 is not attached to the header 10. Applicant has found through testing and experimentation that further operational improvements are gained by positioning the air blower 31 within the outer body shields 8 of the combine harvester 1 and attaching the air blower 31 proximate the clean grain elevator 4 and the underside of the clean grain tank 5 to shelter the air blower 31 and improve its longevity.

The preceding constraints, examples, and configurations in any of the aspects of the present systems & methods disclosed and described herein are for illustrative purposes only, and are in no way limiting to the scope of any of the systems and/or methods as disclosed herein unless so indicated in the following claims. Furthermore, the various solutions, processes, methods, modules, features, aspects, and/or embodiments disclosed or described herein may be implemented in conjunction with one another or independently from one another. Accordingly, the presence or absence of other subject matter that may be complementary to the present systems and/or methods in no way limits the scope of the present systems and/or methods unless so indicated in the following claims.

It should be noted that the present systems and/or methods are not limited to the specific embodiments described herein, but is intended to apply to all similar systems and/or methods for reducing or removing trash accumulation on the feederhouse and header. Modifications and alterations from the described embodiments will occur to those skilled in the art without departure from the spirit and scope of the present systems and/or methods.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A combine harvester configured with a trash removal system comprising:
   a) the combine harvester further comprising at least:
      1) a header, the header positioned at the anterior of the combine harvester and connected to the combine harvester, the header configured to process, collect and transport a quantity of raw grain material;
      2) a feederhouse, the feederhouse connected to and aft of the header and positioned at the anterior of the combine harvester, the feederhouse configured for transporting the quantity of raw grain material;
      3) a threshing system, the threshing system having a threshing system inlet configured to receive and process the quantity of raw grain material from the feederhouse, a clean grain outlet to discharge a quantity of clean grain separated by the threshing system from the quantity of raw grain material and a threshing system outlet to discharge a quantity of non-grain material from the combine harvester;
      4) a clean grain elevator connected to the threshing system for transport of the quantity of clean grain from the threshing system to a clean grain hopper;
      5) an operator cab, the operator cab positioned aft of the header and the feederhouse, the operator cab configured to allow an operator to operate the combine harvester, the operator positioned with a view of the header and an exterior portion of the feederhouse connected to the header;

6) an operations control system, the operations control system configured to allow an operator to control the combine harvester from the operator cab;
7) a power system, the power system providing power for the operation of the header, the feederhouse, the threshing system, the operator cab and the operations control system;
8) a hydraulic system, which is connected to and driven by the power system, the hydraulic system controllable by the operator from the operator cab via the combine harvester operations control system;
9) an electrical system, which is connected to and integrated with the power system, the electrical system is controllable by the operator from the operator cab via the combine harvester operations control system;
10) a frame assembly, the frame assembly allowing interconnection and support of the header, the feederhouse, the threshing system, the operator cab, the operations control system, the power system, the hydraulic system and the electrical system to operate the combine harvester processing raw grain material; and, b) a trash removal system further comprising:
1) an air blower having an inlet and outlet, the air blower powered and controlled via connection with the combine harvester;
2) an air blower mount, the air blower mount configured for attachment to and between the air blower and the combine harvester, wherein the air blower is positioned adjacent the operator cab of the combine harvester via the mount;
3) a blower airline, the blower airline having an inlet and an outlet, the blower airline inlet configured for connection to the air blower outlet for delivering high pressure air from the air blower to the blower airline outlet positioned proximate to an exterior portion of the feederhouse of the combine harvester to remove an accumulation of trash on the exterior portion of the feederhouse, wherein the air blower is controllable by the operator from the operator cab via the combine harvester operations control system and the trash removal system does not obscure the operator's view of the header.

2. The combine harvester configured with a trash removal system according to claim 1 wherein the air blower is positioned proximate the clean grain elevator behind the operator cab of the combine harvester via the mount.

3. The combine harvester configured with a trash removal system according to claim 1 wherein the trash is a mixture of dirt, dust, pollen, grain, leaves and stalks.

4. The combine harvester configured with a trash removal system according to claim 1 wherein the air blower is powered by a hydraulic motor and operation of the hydraulic motor is controllable by the operator from the operator cab via the combine harvester operations control system.

* * * * *